United States Patent [19]

Takeuchi

[11] 4,063,875

[45] Dec. 20, 1977

[54] CEMENT MAKING APPARATUS INCLUDING PREHEATER, KILN, COOLER AND AUXILIARY FURNACE

[75] Inventor: Masaaki Takeuchi, Musashino, Japan

[73] Assignee: Allis-Chalmers Corporation, Milwaukee, Wis.

[21] Appl. No.: 690,991

[22] Filed: May 28, 1976

[51] Int. Cl.² .......................... F27B 7/02; F27B 15/12
[52] U.S. Cl. ...................................... 432/106; 432/16
[58] Field of Search ...................... 432/15, 16, 58, 106

[56] References Cited

U.S. PATENT DOCUMENTS

| | | | |
|---|---|---|---|
| 3,834,860 | 9/1974 | Fukuda et al. | 432/58 |
| 3,881,861 | 5/1975 | Ritzmann | 432/106 |
| 3,904,353 | 9/1975 | Bosshard et al. | 432/106 |
| 3,914,098 | 10/1975 | Sasaki et al. | 432/106 |

*Primary Examiner*—John J. Camby
*Attorney, Agent, or Firm*—Arthur M. Streich

[57] ABSTRACT

An apparatus is disclosed for producing such as Portland cement from pulverant raw material having a preheater, an auxiliary furnace 22, a rotary kiln 2, a cooler, and a single blower connected to the top of the preheater to draw air and combustion gases through the kiln, auxiliary furnace and preheater. Preheater receives waste gas from the rotary kiln for flow through first, second, third and fourth level cyclones, with the first level cyclone(s) $C_1$ being at an elevation higher than the kiln and the second, third and fourth level cyclones ($C_2$, $C_3$ and $C_4$) each being at successively higher elevations. The auxiliary furnace 22 is preferably at the approximate level of the second level cyclone $C_2$. The auxiliary furnace 22 is fed pulverant material from third level cyclone $C_3$ and discharges pulverant material to a flue leading from the kiln to first level cyclones $C_1$, with both such feed to and discharge from the auxiliary furnace proceeding under the influence of gravity without the need for a second blower to pressurize air from the cooler to the auxiliary furnace as has been necessary with arrangements of such systems known to the prior art before the present invention.

3 Claims, 1 Drawing Figure

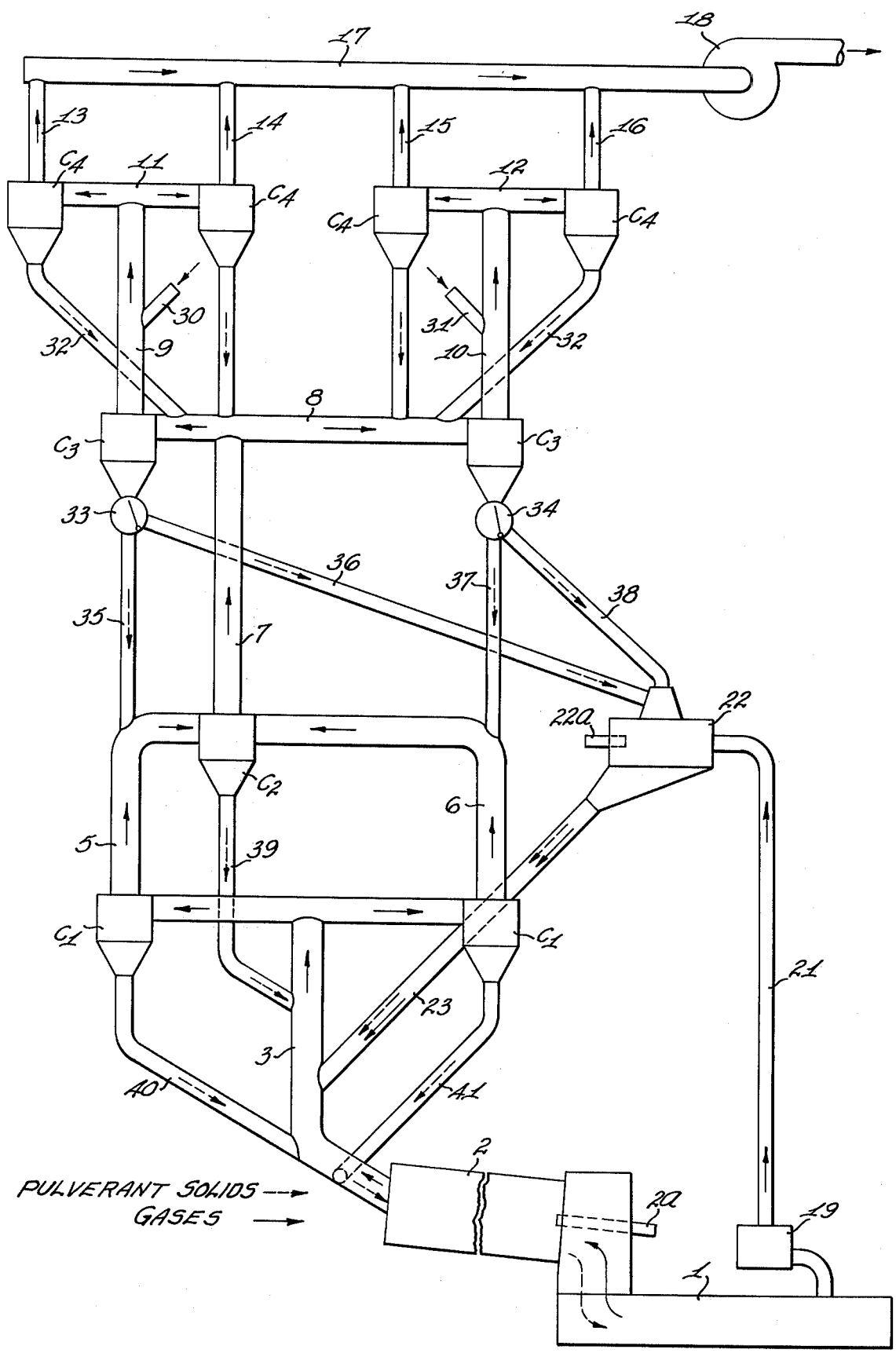

CEMENT MAKING APPARATUS INCLUDING PREHEATER, KILN, COOLER AND AUXILIARY FURNACE

BACKGROUND OF THE INVENTION

1. Field of the Invention

This invention relates to an apparatus for pretreating particulate feed material for a rotary kiln with heated exit gases from the kiln, as is utilized, for example, to produce Portland cement. In particular, this invention relates to such preheaters that comprise an assembly of cyclone dust separators and an auxiliary furnace to additionally heat feed material after the feed material has been preheated but prior to the feed material entering the rotary kiln.

2. Description of the Prior Art

Preheaters for rotary kilns known to the prior art that involve preheating finely divided raw material suspended in and moving generally counter to the flow of heated kiln exit gases flowing through one or more cyclone dust separators are disclosed in such patents as Czechozlovakian Pat. No. 48,169 of 1934; published German Pat. application No. K 156,877 of 1940; U.S. Pat. Nos. 2,648,532 and 2,663,560 of 1953; many others of such patents are identified in U.S. Pat. No. 3,441,258 of 1969 and German Auslegeschrift 1,941,045 published in 1970.

Preheaters of the aforementioned type but which are additionally provided with an auxiliary furnace having one or more auxiliary burners to additionally heat feed material after the feed material has been preheated but prior to the feed material entering the rotary kiln are disclosed in patents such as U.S. Pat. Nos. 3,235,239 of 1966; 3,452,968 of 1969; 3,834,860 of 1974; 3,869,248; 3,873,331; 3,881,862; 3,891,382; 3,891,383; 3,914,098; 3,925,091 and 3,926,651, all of 1975; and 3,932,116 and 3,932,117 of 1976.

SUMMARY OF THE PRESENT INVENTION

The present invention relates to an improved preheater for pulverant kiln feed material of the type shown in the aforesaid German Auslegeschrift No. 1,941,045 published Dec. 10, 1970. Such a preheater as therein disclosed and included in the present invention has a pair of cyclones at a first elevation above a kiln for receiving waste gas from the kiln which is discharged from the pair of first level cyclones $C_1$ to a single second level cyclone $C_2$ at an elevation above the first level cyclones $C_1$. The single second level cyclone $C_2$ in turn discharges the kiln waste gas to a pair of third level cyclones $C_3$ at an elevation above the second level cyclones $C_2$. The third level cyclones $C_3$ may discharge kiln waste gas to a pair of top level cyclones $C_4$ (as shown in German Auslegeschrift No. 1,941,045) or to two pairs of top level cyclones $C_4$ (an arrangement also known to the prior art) which then discharge to a common header connected to a blower. Pulverant raw material is fed into the kiln waste gas prior to such gas passing into the top level cyclones $C_4$ and the raw material travels counter to such gases through cyclones $C_4$, $C_3$, $C_2$, $C_1$, in that order, to be fed to a rotary kiln.

While it is known to the prior art to feed some of the material discharge from a first level cyclone $C_1$ to an auxiliary furnace before entering the kiln (as per aforesaid U.S. Pat. No. 3,881,861) and to similarly direct material from a second level cyclone to an auxiliary furnace, it is an important feature of the present invention that at least a portion of the pulverant material discharged from the third level cyclone $C_3$ is delivered to an auxiliary furnace that burns fuel in air drawn from a cooler connected to the discharge end of the kiln. The material flowing to the auxiliary furnace is further heated therein and then discharged to the kiln waste gas flowing to the inlets of the first level cyclones $C_1$. The advantage of this arrangement according to the present invention is that the conduits to and from the auxiliary furnace have sufficient downward slope for the pulverant material to flow to and from the auxiliary furnace as a result of its own gravity flow, the entire system operates with a single blower connected to the top level cyclones $C_4$, and no blower is required in the conduit from the cooler to the auxiliary furnace as in the case with the prior art arrangements which feed material from first or second level cyclones $C_1$ or $C_2$ to an auxiliary furnace.

The foregoing and other advantages attained by the present invention will be apparent from the following more detailed description of the present invention with reference to the accompanying drawing.

BRIEF DESCRIPTION OF THE DRAWING

The accompanying drawing shows a diagram— materially a side elevation of an embodiment of the present invention with a cooler, preheater, and auxiliary furnace, all according to the present invention.

DESCRIPTION OF THE PREFERRED EMBODIMENT

In the preferred embodiment of the invention shown in the drawing, a gas stream for producing such as Portland cement clinker, originates as atmospheric air passing through a clinker cooler 1. A portion of the air which becomes heated by clinker cooling flow through the cooler 1 passes into a rotary kiln 2 having a fuel burner 2a for burning fuel in such air to produce combustion gases. Waste gases from kiln 2 pass into and through a flue 3 to a conduit 4 that delivers such kiln waste gases to a pair of first level cyclones $C_1$ and then a pair of flues 5, 6 to a single second level cyclone $C_2$ at an elevation spaced above the level of cyclone $C_1$. From cyclone $C_2$ the kiln waste gases pass through a flue 7 to a conduit 8 that delivers such gases to a pair of third level cyclones $C_3$ at an elevation spaced above the level of the cyclone $C_2$. The kiln waste gases pass from the two cyclones $C_3$ through flues 9 and 10, respectively, with flue 9 delivering a portion of the kiln waste gases to a conduit 11 and a first pair of fourth level cyclones $C_4$ while the flue 10 delivers another portion of the kiln waste gases to a conduit 12 and a second pair of fourth level cyclones $C_4$. The four fourth level cyclones $C_4$ are each at an elevation spaced above the third level cyclones $C_3$ and discharge through flues 13-16 into a conduit 17 connected to the inlet of a blower 18.

A second portion of air from the cooler 1 is passed through a coarse pulverant separator 19, which may be such as a particle drop-out chamber, and a flue 21 to an auxiliary furnace 22 having a fuel burner 22a. The auxiliary furnace may be such as has been developed by Onoda Cement Co., Ltd. of Japan and disclosed in FIG. 16 of U.S. Pat. No. 3,834,860, and such a furnace discharges combustion gases and pulverant material through a downwardly inclined duct 23 to flue 3.

Pulverant raw material to move through the system counter to the flow of waste kiln gases is fed into the system through a pair of material inlet chutes 30 and 31 which discharge into flues 9 and 10, respectively. Kiln waste gases and pulverant feed material then pass into the fourth level cyclones $C_4$. Pulverant material is discharged from the fourth level cyclones $C_4$ through pipes 32 to the conduit 8 and into the pair of third level cyclones $C_3$. Adjustable flow dividers 33, 34 divide pulverant discharged from the two third level cyclones $C_3$ between pipes 35, 36 and 37, 38, respectively. Material dropping through pipes 35 and 37 passes into the flues 5, 6, respectively, and into the single second level cyclone $C_2$. From the second level cyclone $C_2$ the pulverant material drops through a pipe 39 into an upper portion of the flue 3 where it is carried through the conduit 4 to both of the first level cyclones $C_1$. Pulverant material drops from the two first level cyclones $C_1$ through pipes 40, 41 into a lower portion of the flue 3 and passes through kiln 2 to the cooler 1.

Pulverant material directed by the flow dividers 33, 34, to pass into the pipes 36, 38 because of the considerable downward slope of pipes 36, 38, slides downwardly under the influence of gravity into the auxiliary furnace 22; and because of the considerable downward slope of the inclined duct 23 the pulverant material also slides from the auxiliary furnace 22 under the influence of gravity into the upper portion of flue 3. Pulverant material passing from duct 23 into flue 3 joins with pulverant material dropping therein through pipe 39 to pass through the first level cyclones $C_1$ and on through kiln 2 to cooler 1 as has been described.

Thus, according to the present invention, feeding the auxiliary furnace 22 pulverant material from the third level cyclones $C_3$ and discharging pulverant material from the auxiliary furnace 22 to the first level cyclones $C_1$ (i.e., bypassing the second level cyclone $C_2$) provides a downward slope needed for flow through pipes 36, 38 and duct 23 to proceed under the influence of gravity without a need to provide a second blower in the flue 21. Prior art arrangements, such as have been referred to, in which either first level $C_1$ or second level $C_2$ cyclones feed an auxiliary furnace, require a second blower because in such arrangements if the pipes feeding pulverant material to the auxiliary furnaces are given sufficient downward slope to cause gravity flow therethrough, then the discharge duct from the auxiliary furnace 22 has insufficient slope for gravity feed and a blower is required in flue 21 to blow pulverant material into flue 3; or if the discharge duct 23 from the auxiliary furnace has sufficient downward slope to provide gravity flow of the pulverant material therethrough, then the pulverant material delivery pipes to the auxiliary furnace have insufficient slope for gravity flow therethrough and the flue 21 must be connected to such delivery pipes and a second blower must be provided to blow pulverant material into the auxiliary furnace 22.

Thus, with each variation of the described system that was known in this field before the present invention, a second blower was needed with the second blower being arranged to pressurize air from the cooler to the auxiliary furnace. The system that has been described as being according to the present invention avoids such a need for a second blower and this is an important feature of the present invention.

The embodiments of the invention in which an exclusive property or privilege is claimed are defined as follows:

1. An apparatus for such as burning pulverant raw material to produce Portland cement in which pulverant feed material and gases follow generally countercurrent paths through a preheater ($C_1$, $C_2$ and $C_3$), an auxiliary furnace (22), a rotary kiln (2), a cooler (1) and a blower (18) connected to the preheaters to draw air and combustion gases through the apparatus; with the preheater having at least a first level stage ($C_1$) at an elevation vertically spaced above the kiln (2), a second level stage ($C_2$) spaced vertically above the first level stage ($C_1$) and a third level stage ($C_3$) spaced vertically above the second level stage ($C_2$); and with both the kiln (2) and the auxiliary furnace (22) being separately connected to the cooler (1) to receive fuel combustion supporting air therefrom; the improvement comprising:

a. a pulverant material transfer pipe (36 and/or 38) connected on a first end thereof to a pulverant material discharge opening (33) of the third level preheater stage ($C_3$) and on a second end thereof to an inlet of the auxiliary furnace (22) for delivering at least a portion of the pulverant material from the third level stage ($C_3$) to the auxiliary furnace (22);

b. a pulverant material transfer duct (23) connected on a first end to a material outlet of the auxiliary furnace (22) providing the sole outlet therefrom and on a second end thereof to a flue passage (3, 4) delivering kiln waste gas to the first level preheater stage ($C_1$); and c. the auxiliary furnace (22) being located at a vertical level between the levels of the first and third level preheater stages ($C_1$ and $C_3$) to provide both the pipe (36 and/or 38) and the duct (23), a downward slope of an angle causing gravity flow of pulverant material through both the pipe and duct.

2. An apparatus according to claim 1 in which the first level preheater stage ($C_1$) comprises a pair of cyclones, the second level preheater stage ($C_2$) comprises a single stage, the third level preheater stage ($C_3$) comprises a pair of cyclones, and a pair of pulverant material transfer pipes (36, 38) are provided with each connecting the discharge of one of the cyclones of the third level preheater stage ($C_3$) to the auxiliary furnace (22).

3. An apparatus according to claim 2 in which the pulverant material discharge opening of each third level ($C_3$) is provided with an adjustable flow divider operative to selectively control and divide the portion of pulverant material flowing therethrough between flows to the auxiliary furnace (22) and to the second level cyclone ($C_2$).

* * * * *